US008212826B1

(12) United States Patent
Williams et al.

(10) Patent No.: US 8,212,826 B1
(45) Date of Patent: Jul. 3, 2012

(54) USING GRAPHICS PROCESSING UNIT ("GPU")-GENERATED DATA IN-SITU TO CHARACTERIZE THE ABILITY OF A CABLE TO CARRY DIGITIZED VIDEO

(75) Inventors: Ian M. Williams, Menlo Park, CA (US); Dat T. Nguyen, Santa Clara, CA (US); Lauro B. Mañalac, San Jose, CA (US); Thomas J. True, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1004 days.

(21) Appl. No.: 11/347,531

(22) Filed: Feb. 3, 2006

(51) Int. Cl.
*G06F 13/14* (2006.01)
(52) U.S. Cl. ......................... 345/520; 386/231
(58) Field of Classification Search ................. 345/520; 386/231
See application file for complete search history.

(56) References Cited

U.S. PATENT DOCUMENTS

| | | | | |
|---|---|---|---|---|
| 5,051,816 A * | 9/1991 | Harrison et al. | ............... | 714/736 |
| 5,751,766 A * | 5/1998 | Kletsky et al. | ................. | 375/224 |
| 5,920,340 A * | 7/1999 | Man et al. | ..................... | 348/181 |
| 6,269,482 B1 * | 7/2001 | Gershfeld | ...................... | 725/107 |
| 6,297,845 B1 * | 10/2001 | Kuhn et al. | .................... | 348/192 |
| 6,496,221 B1 * | 12/2002 | Wolf et al. | ..................... | 348/192 |
| 6,777,952 B2 * | 8/2004 | Seymour | ....................... | 324/525 |
| 6,839,055 B1 * | 1/2005 | Nguyen | ........................ | 345/204 |
| 7,120,816 B2 * | 10/2006 | Williams et al. | .............. | 713/400 |
| 7,231,560 B2 * | 6/2007 | Lai et al. | ....................... | 714/712 |
| 2004/0150719 A1 * | 8/2004 | Whitehouse | .................. | 348/182 |
| 2006/0284632 A1 * | 12/2006 | Braverman et al. | ........... | 324/765 |

* cited by examiner

Primary Examiner — Maurice L McDowell, Jr.
(74) Attorney, Agent, or Firm — Cooley LLP (57) ABSTRACT

Disclosed are an apparatus, a computer device, a system, computer readable media and a method for using graphics processing unit ("GPU")-generated data to characterize, in-situ, the ability of a cable to reliably carry digitized video, among other things. In one embodiment, a computing device includes a processor coupled via a system bus to a graphics engine and a video cable-testing apparatus. This apparatus has an input port configured to couple to the digitized video cable to receive pixel data generated by the graphics engine. It also has a signal integrity evaluator ("SIE") configured to identify the digitized video cable as the source an amount of data corruption, the amount of data corruption being a function of the pixel data. The signal integrity evaluator includes a classifier to classify the amount of data corruption into classes that each represents various degrees of degradation of the computer-generated video images.

11 Claims, 5 Drawing Sheets

USING GRAPHICS PROCESSING UNIT ("GPU")-GENERATED DATA IN-SITU TO CHARACTERIZE THE ABILITY OF A CABLE TO CARRY DIGITIZED VIDEO

BRIEF DESCRIPTION OF THE INVENTION

This invention relates generally to computing devices and graphics processing units, and more particularly, to an apparatus for characterizing a digitized video cable in-situ using GPU-generated data, such as pixel data. In one embodiment, the apparatus reduces the time to identify a source of data corruption by determining that the cable is affecting pixel data during transmission.

BACKGROUND OF THE INVENTION

Professional video creators and the television broadcasters are increasingly using graphics processing units ("GPUs") to create sophisticated computer-generated video images, including high-definition ("HD") composited video. Computers for creating such images typically implement a GPU with a video formatting card. The GPU produces the computer-generated video images, and the video formatting card converts the GPU-generated video images into a standard video format. Examples of standard video formats include the Standard Definition Serial Digital Interface ("SD-SDI") and/or High Definition Serial Digital Interface ("HD-SDI") formats. One such standard to which professional video creators and the television broadcasters frequently adhere is the SMPTE 259M standard, as maintained by the Society of Motion Picture and Television Engineers ("SMPTE"). The video formatting card can also apply special-effects techniques, such as video compositing, to the streaming video produced by the GPU. Video compositing combines two video images by eliminating portions of one video, and replacing the remaining portions over the other video. Conventionally, the video formatting card is a daughterboard mounted on a graphics card that includes a GPU. While functional, video formatting cards integrated with graphics cards have several drawbacks.

One drawback to this approach is that the integrated video formatting card becomes redundant in computers implementing two or more GPUs. While multiple GPUs can enhance the ability of the computer to generate high-quality video images, duplicate video formatting cards are unnecessary, and thus represent wasted resources. To remedy this drawback, the video formatting card can be implemented separately from the graphics cards. As such, only one video formatting card need be used to format the computer-generated video images generated by multiple graphics cards. Consider that a computer, such as a workstation, can implement one or more GPUs and a single video formatting card, each in different slots. In this approach, a video cable, or "loop-back cable," externally connects the GPU to the video formatting card to transfer the GPU-generated video images. But video cables have drawbacks, too.

A drawback to using video cables designed to carry high-speed digitized video images is that many video cables are susceptible to variations in manufacturer, environment factors, mechanical stresses (i.e., wear and tear from frequent insertion and extraction), and the like. These factors affect the ability of video cables to reliably transfer video images. Another drawback is that defects in video cables, such as breaks or other physical abnormalities, are manifested as poor video quality, such as discolored or blank pixels. As laypersons cannot readily detect the source of the defects, they usually attribute the inferior video quality to the GPU. Yet another drawback is that cable defects can affect the integrity of pixel data intermittently, requiring users to frequently swap cables without assurance that problems will not reemerge. Specialized cable testers are required to definitively characterize cables as defective. These testers apply test signals to perform both functional and parametric tests on the cables. To implement these tests, however, the cable is removed from its operative location. Regardless, these testers are typically used only in production, and thus are generally not available to laypersons.

In view of the foregoing, it would be desirable to provide an apparatus, a computer device, a system, computer readable media and a method that minimize the above-mentioned drawbacks by using graphics processing unit ("GPU")-generated data to characterize, in-situ, the ability of a cable to reliably carry digitized video.

SUMMARY OF THE INVENTION

Disclosed are an apparatus, a computer device, a system, computer readable media and a method for using graphics processing unit ("GPU")-generated data to characterize, in-situ, the ability of a cable to reliably carry digitized video, among other things. In one embodiment, a computing device includes a processor coupled via a system bus to a graphics engine and a video cable-testing apparatus. This apparatus has an input port configured to receive pixel data generated by the graphics engine. It also has a signal integrity evaluator ("SIE") configured to identify the digitized video cable as the source of an amount of data corruption, the amount of data corruption being a function of the pixel data. The signal integrity evaluator can include a classifier to classify the amount of data corruption into classes, which represent various degrees of degradation of the computer-generated video images.

Advantageously, the signal integrity evaluator eliminates a requirement to disconnect a digitized video cable from an input port, thereby facilitating in-situ (i.e., unmoved from the physical location of its functional implementation) testing of the digitized video cable. In particular, the signal integrity evaluator obviates normal application of specialized test signals that are solely designed to perform functional and parametric tests on the digitized video cable. Beneficially, the signal integrity evaluator helps laypersons minimize time spent trouble-shooting problematic video. It does so, at least in part, by reducing the time to detect the source of data corruption causing degradation of the computer-generated video images. Thus, the signal integrity evaluator eliminates the graphics engine, such as a GPU, as the source of data corruption. It also advantageously operates to classify a measured amount of pixel data corruption into one of a number of classes that quantify the severity of video degradation. Then, a producer of digitized video can determine whether to replace the digitized video cable.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
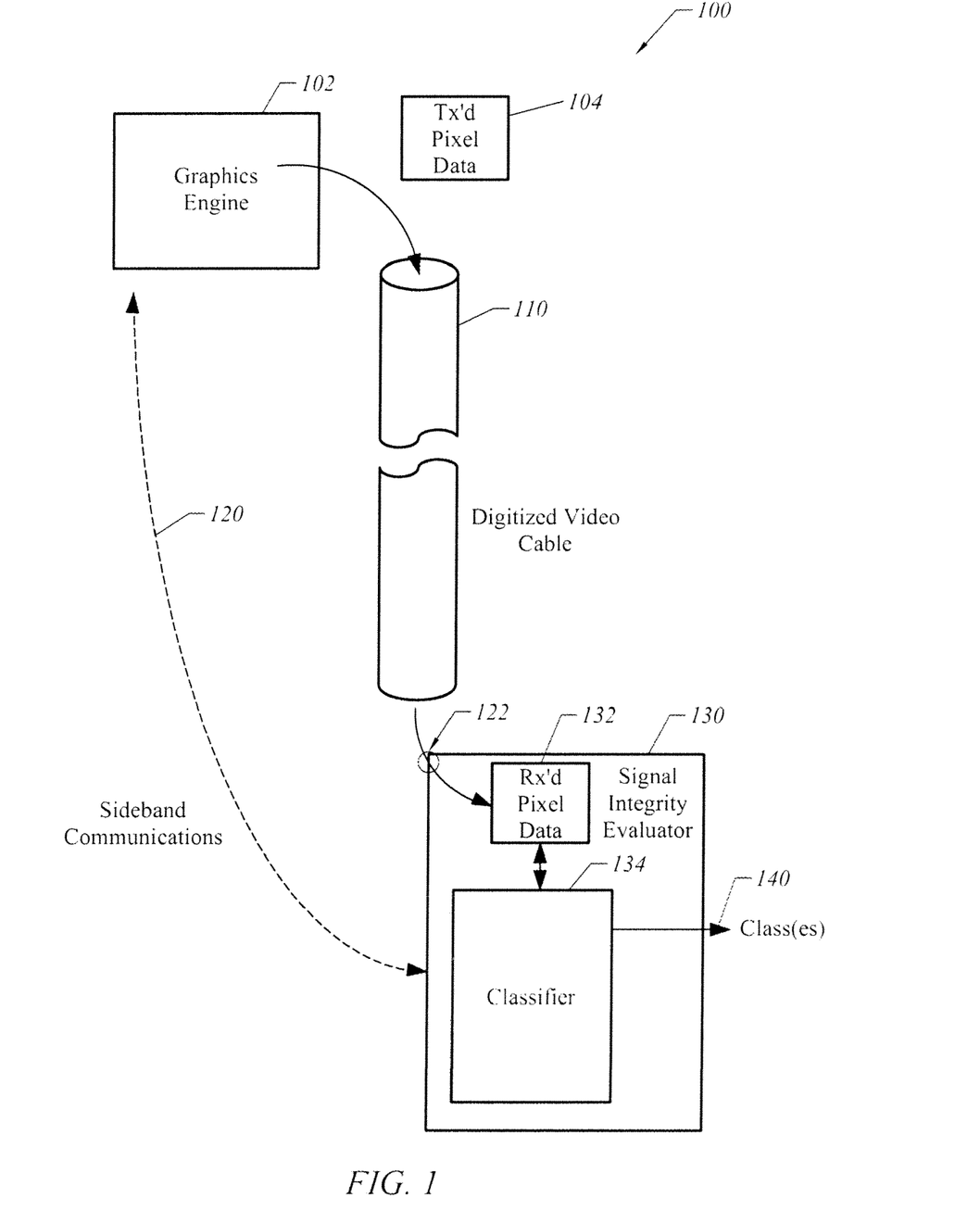
FIG. 1 is a block diagram of a signal integrity evaluator ("SIE") for identifying, in situ, whether a digitized video cable is a source of degradation in computer-generated video images, according to at least one specific embodiment of the invention.

FIG. 1 is a block diagram of a signal integrity evaluator ("SIE") for identifying, in situ, whether a digitized video cable is a source of degradation in computer-generated video images, according to at least one specific embodiment of the invention. In particular, diagram 100 shows signal integrity evaluator 130 being configured to use GPU-generated data, such as pixel data, to determine whether digitized video cable 110 is corrupting data passing through it. Corrupted pixel data results in degraded computer-generated video images produced. Advantageously, signal integrity evaluator 130 eliminates a requirement to disconnect digitized video cable 110 from an input port 122, thereby facilitating in-situ (i.e., unmoved from the physical location of its functional implementation) testing of digitized video cable 110. In particular, signal integrity evaluator 130 obviates normal application of specialized test signals that are solely designed to perform functional and parametric tests on digitized video cable 110. Beneficially, signal integrity evaluator 130 helps laypersons minimize time spent trouble-shooting problematic video. It does so, at least in part, by reducing the time to detect the source of data corruption. Thus, signal integrity evaluator 130 can eliminate graphics engine 102 as the source of video degradation. It also advantageously operates to classify a measured amount of pixel data corruption into one of a number of classes that quantify the severity of video degradation for a producer of digitized video. The producer then can determine whether to replace digitized video cable 110.

As shown in FIG. 1, digitized video cable 110 couples graphics engine 102 to signal integrity evaluator 130. In operation, graphics engine 102 generates computer-generated video images, and then transmits the images as transmitted ("Tx'd") pixel data 104 into digitized video cable 110. At one end, digitized video cable 110 is connected to an output port (not shown) of graphics engine 102 and at the other end, it is connected to signal integrity evaluator 130 at input port 122. Signal integrity evaluator 130 receives the computer-generated video images as received ("Rx'd") pixel data 132. Classifier 134 inspects received pixel data 132 and then classifies the data in two or more classes. For example, classifier 134 can classify the amount of pixel data corruption as either "good" (i.e., "pass") or "not good" (i.e., "fail"). Alternatively, classifier can 134 classify the amount of pixel data corruption in any number of classifications of data corruption, such as "grade 1" (e.g., no/negligible degradation), "grade 2" (e.g., sufficient degradation warranting cable replacement), . . . , up through "grade n" (e.g., severe degradation). Classifier 134 then can generate a signal 140 indicative of the classification so that, for example, a producer of video can determine whether to replace digitized video cable 110.

In one embodiment, classifier 134 determines the amount of pixel data corruption by quantifying differences between one or more values of transmitted pixel data 104 and one or more values of received pixel data 132. For example, consider that digitized video cable 110 is defective and thus corrupts transmitted pixel data 104 during transmission. Classifier 134 can calculate the amount of pixel data corruption as a function of the values of the pixel data. For greater differences between the values of transmitted pixel data 104 and received pixel data 132, classifier 134 will determine greater amounts of pixel data corruption, and thus, greater degrees of degradation of the computer-generated video images. In one embodiment, signal integrity evaluator 130 identifies which component of a color space is causing the amount of pixel data corruption. So if digitized video cable 110 separately transmits each component of a color space, then classifier 134 can classify the amount of pixel data corruption for each component. For example, if graphics engine 102 generates the computer-generated video images in a red-green-blue ("RGB") color space, then classifier 134 can determine the amount of pixel data corruption associated with each of the red, green and blue components.

In various embodiments, graphics engine 102 is disposed within a computing device and signal integrity evaluator 130 can be disposed in the same or a different computing device. For example, signal integrity evaluator 130 can be formed as part of a video formatting card. Regardless, digitized video cable 110 can function as a loop-back cable externally extending between two computers or two different slots of the same computer. In one embodiment, graphics engine 102 initiates testing of digitized video cable 110 by sending a test mode initiation signal via a sideband communications path 120. Signal integrity evaluator 130 can transmit error notification signals back via path 120 to graphics engine 102 or any other component of a computing device (not shown) in which graphics engine 102 resides.

As used herein, the term "pixel data" in some embodiments can refer to data constituting pixels or portions thereof (i.e., subpixels) as well as other video-related data, such as alpha filtering values and the like. Pixel portions include components of a color space and parts thereof. For example, a part of a pixel portion can be a subpixel constituting an upper set of bits representing a part of a color component, such as the upper 8 bits (of 16 bits) of a red color component. As used herein, the term "pixel data value" in some embodiments can refer to a value expressed by a number of bits representing pixel data. As another example, FIG. 2 depicts pixel data 214 being composed of multiple subpixels ("subpixel data") 215, 216 and 217.

Figure 2:
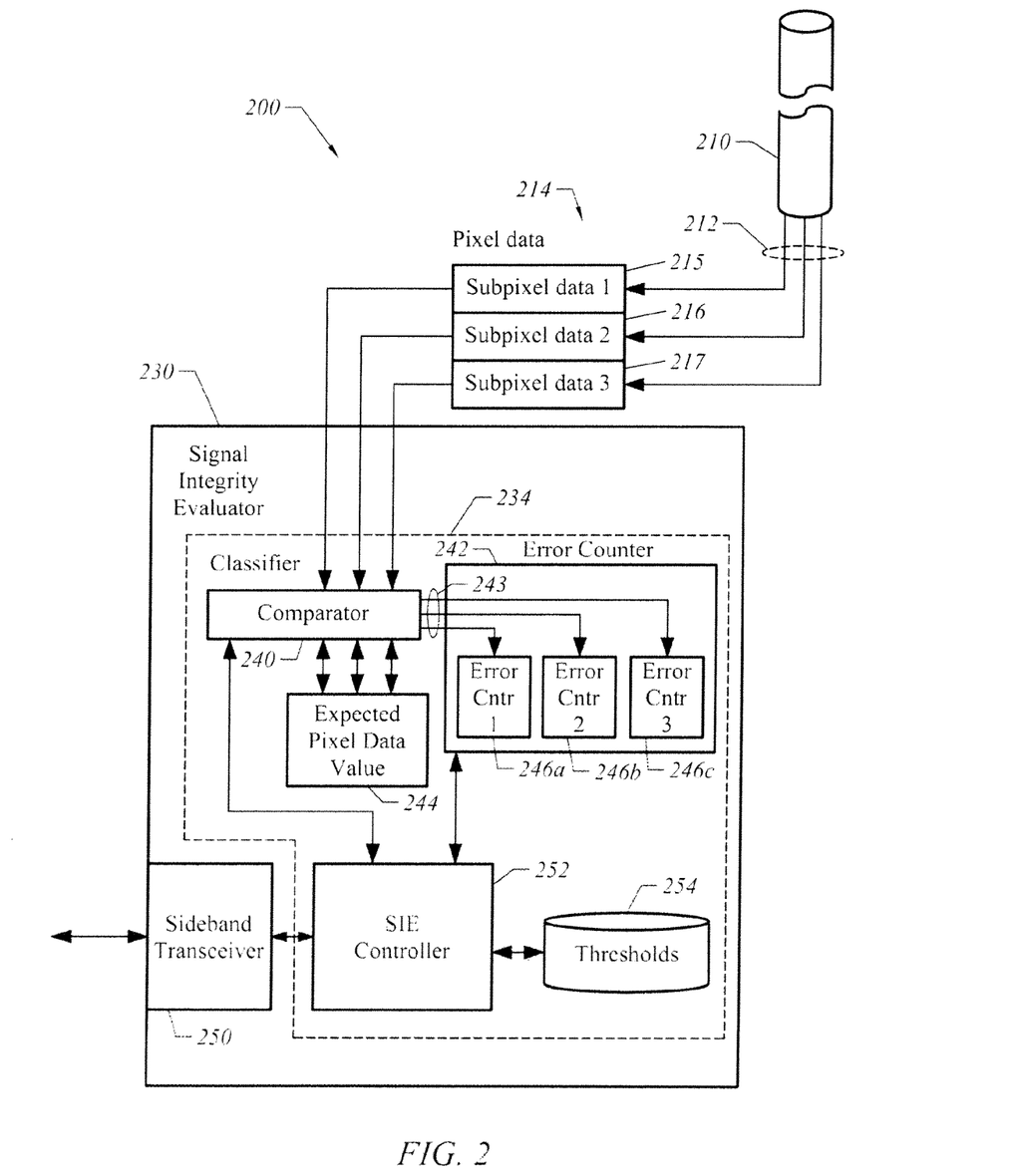
FIG. 2 is a block diagram of a specific implementation of a signal integrity evaluator, according to an embodiment of the invention.

FIG. 2 is a block diagram of a specific implementation of a signal integrity evaluator, according to an embodiment of the invention. Diagram 200 shows a signal integrity evaluator 230 receiving received pixel data 214 from a digitized video cable 210. Signal integrity evaluator 230 includes a classifier 234 and a sideband transceiver 250 for exchanging control and data signals with a processor or any like entity that communicates the results of the cable characterization tests to, for example, a producer of video. Classifier 234 includes a comparator 240 for obtaining received pixel data 214, an expected pixel data value data store 244, an error counter 242, a signal integrity evaluator ("SIE") controller 252 and a thresholds data store 254. Comparator 240 is configured to determine whether received pixels data 214 matches expected pixels data stored in expected pixel data value data store 244. The expected pixel data are representative of the transmitted pixels prior to entering digitized video cable 210. Matches between received pixel data 214 and expected pixels data are indicative of no pixel data corruption, whereas mismatches signify at least some pixel data corruption. Comparator 240, upon detecting a mismatch, generates an error signal 243 for each mismatch to send to error counter 242.

Error counter 242 is responsive to error signal 243 and tracks mismatches. Error counter 242 can store the accumulation of mismatch occurrences, whereby the cumulative number of mismatches is indicative of an amount of pixel data corruption, according to one embodiment. Thresholds data store 254 stores one or more threshold values each of which is associated with a different amount of data corruption. Signal integrity evaluator controller 252 is coupled to error counter 242 to compare one or more error counter values of error counter 242 to thresholds stored in thresholds data store 254. Upon detection of a threshold event, signal integrity evaluator controller 252 generates a threshold-exceeded signal. A threshold event occurs, for example, when an error counter value (i.e., the number of cumulative mismatches) surpasses a threshold value. Sideband transceiver 250 is configured at least to relay the threshold-exceeded signal to a processor to initiate corrective action, for example, by a person producing video or by some other automated means. In some cases, sideband transceiver 250 is communicatively coupled to a system bus of a computing device.

To illustrate a specific implementation of signal integrity evaluator 230, consider that digitized video cable 210 provides different channels 212 of serialized pixel data. Each of channels 212 can carry pixel data 214 as subpixel data. So subpixel data ("1") 215 can include red color component data, subpixel data ("2") 216 can include green color component data, and subpixel data ("3") 217 can include blue color component data. Comparator 240 can separately receive and compare each of subpixel data 215, 216 and 217 to different expected pixel data values. Error counter ("error cntr 1") 246a, error counter ("error cntr 2") 246b, and error counter ("error cntr 3") 246c accumulate mismatches occurring between expected pixel data values and values of subpixel data ("1") 215, subpixel data ("2") 216, and subpixel data ("3") 217, respectively.

Signal integrity evaluator controller 252 monitors the number of mismatches for each error counter 246 against one or more thresholds. Each threshold can represent a grade of video quality. For example, a first threshold can define "no/negligible" pixel data corruption as "grade 1." Similar thresholds can define additional grades, such as "grade 2" (replace cable) and "grade 3" (severe data corruption). Then, signal integrity evaluator controller 252 can communicate any number of threshold events to a processor so that appropriate corrective actions can be undertaken. In one embodiment, signal integrity evaluator controller 252 communicates a threshold event by sending an interrupt to a GPU or to a processor to initiate corrective action. Signal integrity evaluator controller 252 can initiate test mode by receiving a test mode initiation signal via sideband transceiver 250 from a GPU or the like. In another embodiment, signal integrity evaluator controller 252 programs the expected pixel data value into data store 244. Specifically, the first pixel data 214 received after test mode begins is stored in data store 244. Then, subsequent instances of pixel data 214 are compared against the value stored in data store 244 to determine whether there are any unexpected differences. In some embodiments, each component can have different pixel data values, some of which are configured to optimally test the specific color component. In one embodiment, pixel data 214 for the same pixel in different frames is the same, but differs from other pixel data 214 for other pixels in the same frame. In a specific embodiment, pixel data 214 is transmitted in association with different monitor/display refresh rates. In one embodiment, the amount of pixel data 214 constituting pixels can be of any amount. For example, signal integrity evaluator 230 can evaluate any number a number of pixels that constitute one or more frames.

Figure 3:
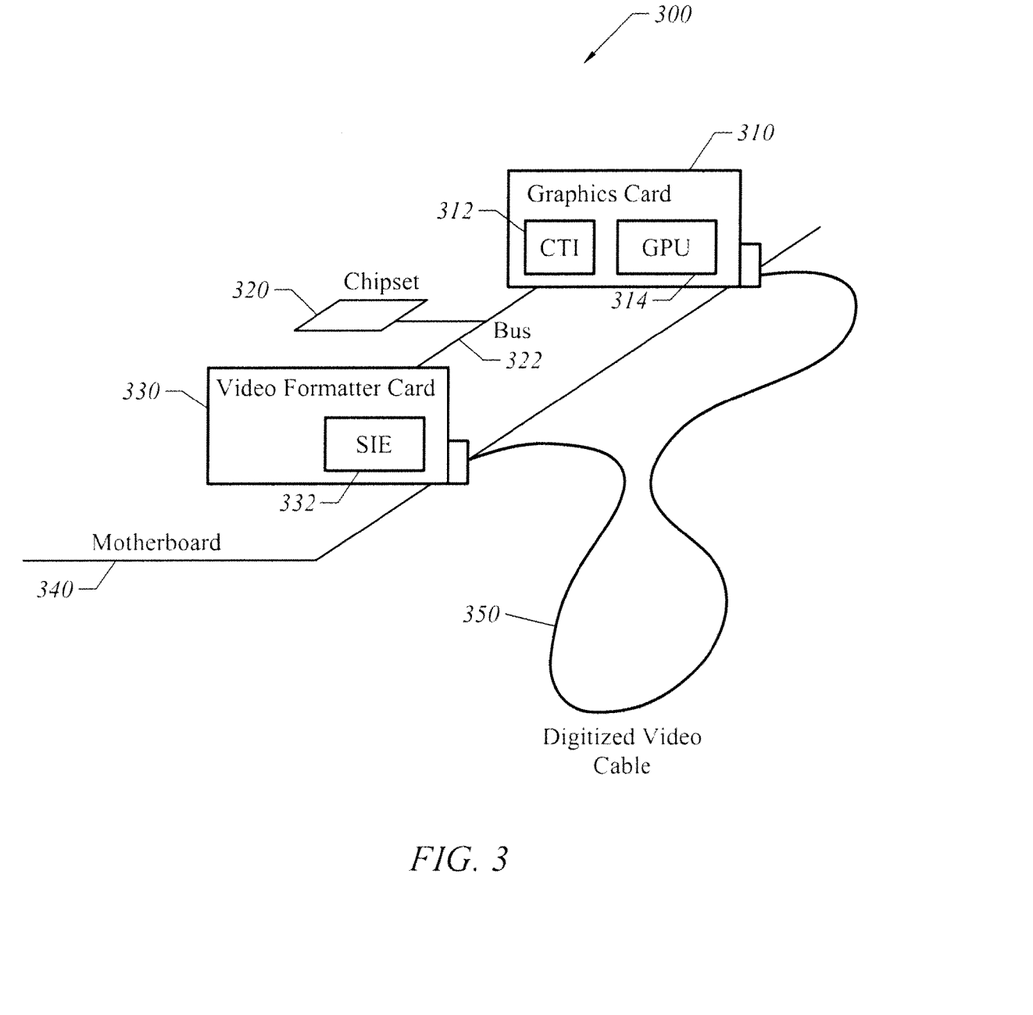
FIG. 3 is a block diagram illustrating a signal integrity evaluator disposed within a computing device, according to one embodiment of the invention.

FIG. 3 is a block diagram illustrating a signal integrity evaluator disposed within a computing device, according to one embodiment of the invention. Computing device 300 includes a chipset 320, a graphics card 310 including a graphics processing unit ("GPU") 314, and a video formatter card 330, each of which are coupled to a system bus 322 for facilitating data communications among chipset 320, graphics card 310 and video formatter card 330. Chipset 320 includes a processor (not shown), such as a central processing unit, for executing instructions from a system memory (not shown) to test a video cable 350. In the example shown, signal integrity evaluator ("SIE") 332 resides in video formatter card 330, and it functions to determine whether video cable 350 is an external agent corrupts pixel data during transmission. Signal integrity evaluator 332 can also store a subset of pixel data as expected pixel data and can compare subsequent subsets of the pixel data to the expected pixel data. As such, the subsequent subsets of pixel data can be examined to determine whether any anomalies of video cable 350 might corrupt the pixel data. If signal integrity evaluator 332 detects an error, then it can generate, for example, an interrupt for either GPU 314 or the processor to signal a mismatch in pixel data.

A cable test initiator ("CTI") 312 resides either on graphics card 310 or in GPU 314 and includes logic to generate a test mode signal to send to signal integrity evaluator 332 for evaluating the signal integrity of pixel data communicated over video cable 350. In at least one embodiment, cable test initiator 312 is responsive to a command from the processor in chipset 320 to test video cable 350. In particular, cable test initiator 312 can send a test initiation signal to GPU 314 to initiate generation of pixel data designed to include values configured to test video cable 350. If signal integrity evaluator 332 does not detect an error during test mode, then GPU 314 can interpret the absence of an interrupt as an indication that there are no errors in pixel data.

In one embodiment, video formatter card 330 formats the GPU-generated video data into a Serial Digital Interface ("SDI") video format, such as HD-SDI. Further, video cable 350 is configured to communicate digitized video signals serially using differential signaling. As such, video cable 350 is compatible with Digital Video Interface ("DVI") cables, High-Definition Multi-media Interface ("HDMI") cables, and the like. In some embodiments, video cable 350 can be any cable that supports transition minimized differential signaling ("TMDS"). GPU 314 can be a general purpose GPU ("GPGPU"). In at least one embodiment, system bus 322 is a PCIe, or PCI Express bus, which is a bus architecture and protocol defined in a specification maintained by the Peripheral Component Interconnect Special Interest Group ("PCI-SIG").

Figure 4:
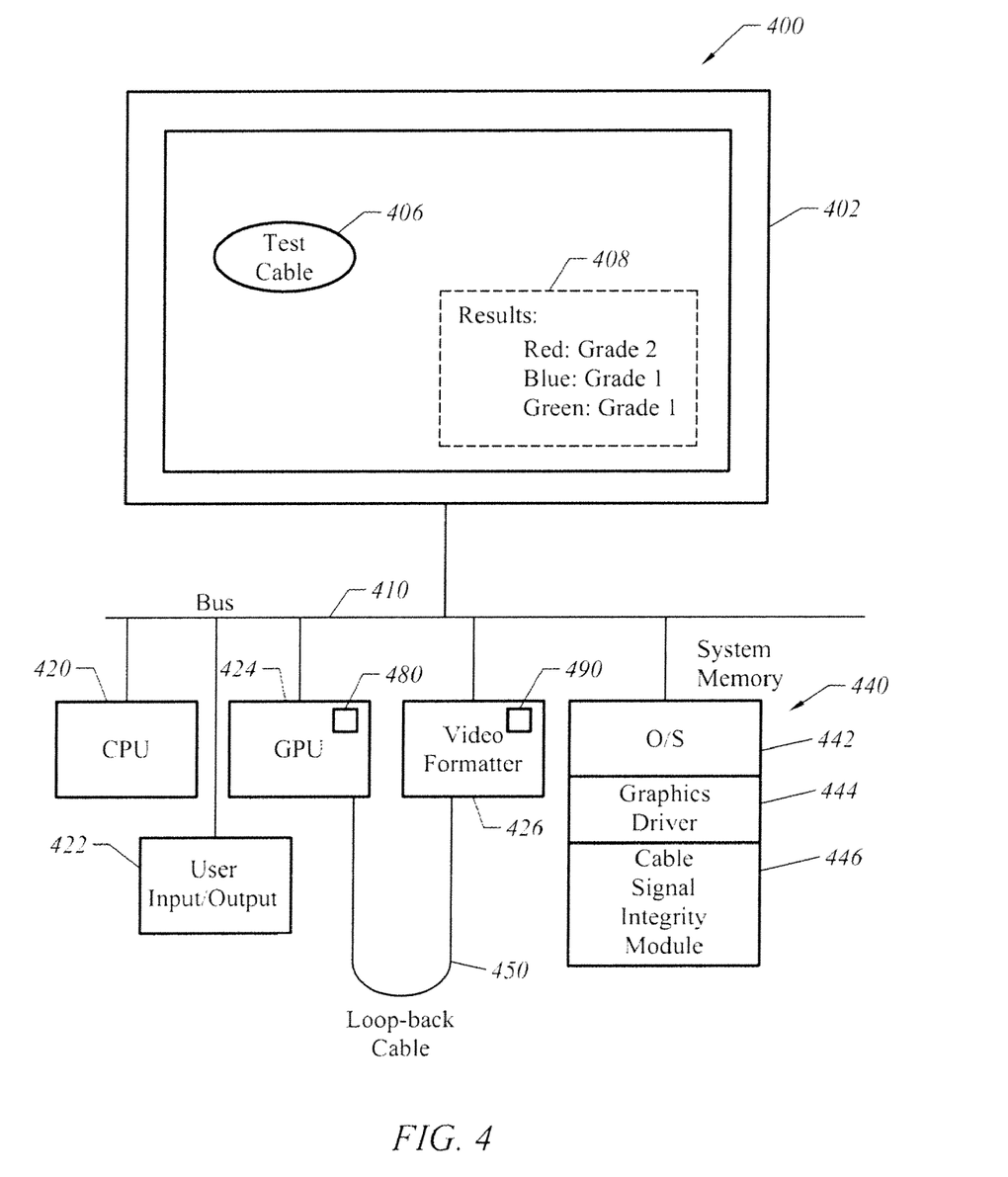
FIG. 4 illustrates an apparatus constructed in accordance with an embodiment of the invention.

FIG. 4 illustrates an apparatus constructed in accordance with an embodiment of the invention. Apparatus 400 is a computing device that includes a central processing unit ("CPU") 420 coupled to a set of user input/output devices 422 via a system bus 410. Input/output devices 422 can include a keyboard, mouse, touch screen, printer, and the like. Another input/output device is a graphical user interface ("GUI") 402, which is implemented with a display. Apparatus 400 also includes a GPU 424 and a video formatter 426. Also attached to the system bus 410 is a memory 440, which may be primary and/or secondary memory. The memory 440 stores a number of executable programs, many of which are known in the art. For example, memory 440 stores an operating system ("O/S") 442 and a graphics driver 444. Operating system 442 may be any of a number of available operating systems. Graphics driver 444 operates to send graphics-related commands to GPU 424.

The elements of FIG. 4 discussed up to this juncture are well known in the art. The various embodiments of the invention are directed toward the remaining executable modules used to implement techniques of the invention. As such, executable modules can be stored in memory 440 or elsewhere in apparatus 400. For example, apparatus 400 can include a cable test initiator module 480 as part of GPU 424, and can include a signal integrity evaluator module 490 as part of video formatter 426.

Cable signal integrity module 446 includes one or more modules of executable instructions to test a video cable 450 looping backing into computing device 400 for formatting computer-generated video images. Specifically, it includes one or more executable instructions to accept signals from graphical user interface 402 initiating a test for video cable 450 as a Digital Video Interface ("DVI") cable. For example, a user can activate such a test by selecting an icon ("test cable") 406 on graphical user interface 402. Cable signal integrity module 446 includes executable instructions to cause the generation of a stream of pixel data in response to the acceptance of the user input. For example, cable test initiator module 480 can generate the stream of pixel data having values selected to test video cable 450 in response to receiving a control signal from cable signal integrity module 446. The control signal from cable signal integrity module 446 can also cause video formatter 426 to enter a test mode to receive the stream of pixel data in the test mode. Cable signal integrity module 446 can also include instructions to classify video cable 450 into a class according to its effectiveness in transmitting the stream of pixel (e.g., without errors), and generate a result representative of the class on graphical user interface 402 to specify the degradation of the computer-generated video images. For example, cable signal integrity module 446 can covey the degradation to the user as a result 408, which shows the red color component being a "grade 2" (e.g., video cable 450 is substandard). As such, cable signal integrity module 446 includes one or more executable instructions to generate result 408 as an indication to replace video cable 450.

In one embodiment, signal integrity evaluator module 490 further includes one or more executable instructions to compare the stream of pixel data to one or more expected pixel data values, and to maintain a count for each subset of pixel data not matching the one or more expected pixel data values. Further, the one or more executable instructions can also compare the count to a threshold error rate to determine whether the data corruption surpasses the threshold error rate. Note that in one embodiment, the executable instructions of cable test initiator module 480 and signal integrity evaluator module 490—in whole or in part—can be disposed in memory 440. In other embodiments, any of the executable instructions for testing cable 450 can be distributed in any number of distributed modules within apparatus 400, where distributed modules can comprise software, hardware, or a combination thereof.

Figure 5:
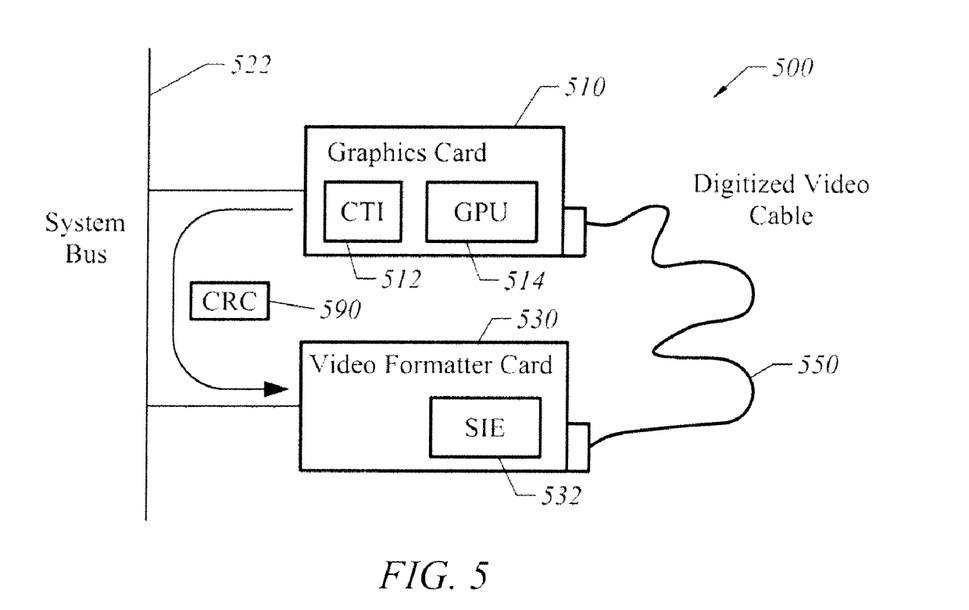
FIGS. 5 and 6 depict alternative techniques of communicating expected GPU-generated data to determine the integrity of a digitized video cable, according various embodiments of the invention.
Figure 6:
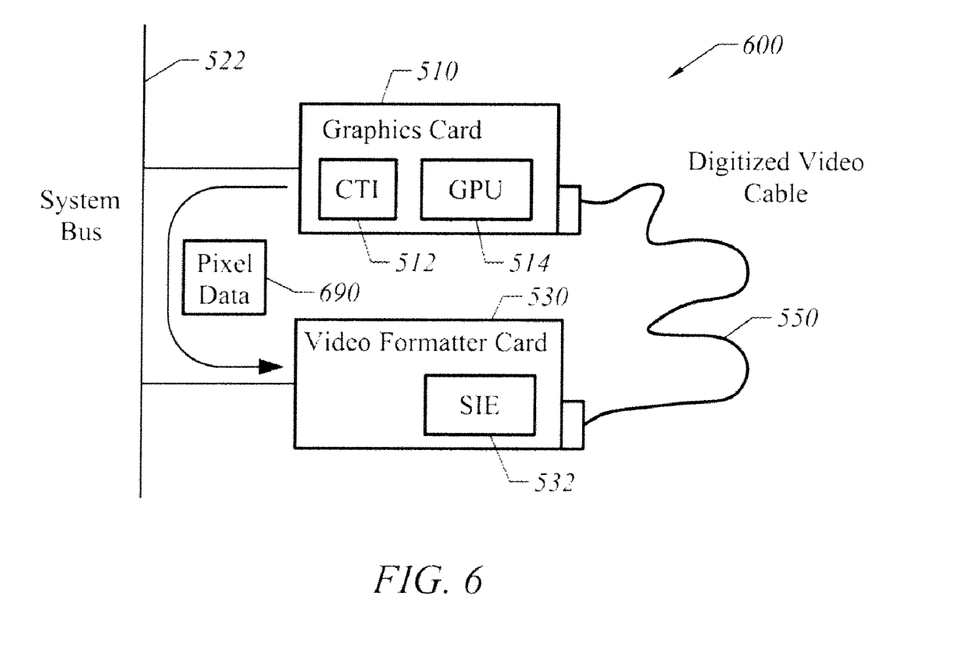

FIGS. 5 and 6 depict alternative techniques of communicating expected GPU-generated data to determine the integrity of a digitized video cable, according various embodiments of the invention. Computing device 500 of FIG. 5 includes a graphics card 510 having a graphics processing unit ("GPU") 514, and a video formatter card 530, each of which are coupled to a system bus 522 for facilitating sideband data communications between graphics card 510 and video formatter card 530. In this example, graphics card 510 also includes a cable test initiator ("CTI") 512 and video formatter card 530 includes a signal integrity evaluator ("SIE") 532, both of which are used to test digitized video cable 550. In one embodiment, a checksum ("CRC") 590, or the like, is generated by a cycle redundancy check algorithm/circuit and is transmitted over the sideband communications channel formed on system bus 522. Signal integrity evaluator ("SIE") 532 uses this data as expected data values with which to compare the checksums of pixel data being transmitted via digitized video cable 550. Mismatches in checksums can indicate a defective cable 550. In FIG. 6, computing device 600 includes similar elements as shown in FIG. 5. But in FIG. 6, pixel data 690 as expected pixel data values are transmitted over the sideband communications channel formed on system bus 522, rather than over digitized video cable 550.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. Although the above descriptions of the various embodiments relate to SDI video formats, the discussion is applicable to any type of video formats requiring conversion from a format useable by a GPU. In addition, the various embodiments can test other types of video cables other than DVI cables.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A computing device comprising:
a system bus;
a processor coupled to the system bus for executing instructions to test a video loopback cable;
a graphics card including a graphics processing unit (GPU) coupled to the system bus;
a video formatter card coupled to the system bus for formatting computer-generated video images, the video formatter card including a signal integrity evaluator ("SIE") configured to identify a digitized video loopback cable coupling pixels from the graphics card to the video formatter card as an external agent affecting values of pixel data during transmission; and
a cable test initiator in the graphics card being configured to send a test mode initiation signal to said signal integrity evaluator in the video formatter card via a sideband communications path in order to initiate testing of the digital video loopback cable to determine whether said digitized video cable is affecting said values, said cable test initiator being responsive to a command from said processor to test said digitized video cable, wherein said cable test initiator is further configured to send a test initiation signal to said GPU for generating pixel data having values selected to test said digitized video cable, said GPU being configured to send said pixel data to said signal integrity evaluator via said digitized video cable; wherein said signal integrity evaluator receiving the test mode initiation signal over the sideband communications path eliminates a requirement to disconnect said video loopback cable to apply test signals to perform testing, thereby providing for in-situ testing of said video loopback cable to determine whether said video loopback cable requires replacement and wherein said in-situ testing eliminates the graphics card as the source of data corruption.

2. The computing device of claim 1 wherein said signal integrity evaluator is further configured to store a subset of said pixel data as expected pixel data and to compare subsequent subsets of said pixel data to said expected pixel data.

3. The computing device of claim 1 wherein said signal integrity evaluator is disposed on said video formatter card, said cable test initiator is disposed on said graphics card, said digitized video cable is compatible with Digital Video Interface ("DVI") cables, and said video formatter card being configured to format video data generated by said GPU into a Serial Digital Interface ("SDI") video format in a run mode and being configured to test said digitized video cable in a test mode.

4. The computing device of claim 1, wherein said sideband communications path comprises a system bus coupling said graphics card and said video formatter card.

5. The computing device of claim 1, wherein said signal integrity evaluator further comprises a classifier to classify said amount of data corruption into at least three classes that each represents various degrees of degradation of said computer-generated video images, said classifier being configured to specify one class from said classes that is associated with said amount of data corruption, wherein said classes include a first class indicative of substantially no degradation of said computer-generated video images, a second class indicative of severe degradation of said computer-generated video images, and at least one intervening class indicative of a degree of degradation requiring replacement of said digitized video cable.

6. A method to test a video cable looping backing from a graphics card to a video formatter card for formatting computer-generated video images, the method comprising:
at a graphics card, accepting signals from a user interface initiating a test for a Digital Video Interface ("DVI") cable;
at the graphics card, a cable test initiator in the graphics card generating a test mode initiation signal to configure the video formatter card to receive a stream of pixel data in a test mode, the test mode initiation signal being transmitted to the video formatter card over a sideband communications path;
at the graphics card, generating said stream of pixel data in the graphics card in response to one or more executable instructions to accept said signals, said stream of pixel data being transmitted to said video formatter card over said Digital Video Interface cable and having values selected to test said Digital Video Interface cable;
at the video formatter card, entering a test mode in response to receiving the test mode initiation signal over the sideband communications path and classifying said Digital Video Interface cable based on said stream of pixel data having values selected to test said Digital Video Interface Cable; and
generating a result representative of said classifying on a user interface to specify the degradation of said computer-generated video images caused by said Digital Video Interface Cable;
wherein said video formatter card receiving the test mode initiation signal over the sideband communications path eliminates a requirement to disconnect said Digital Video Interface cable to apply test signals to perform testing, thereby providing for in-situ testing of said Digital Interface cable to determine whether said Digital Interface cable requires replacement; and
wherein said in-situ testing eliminates the graphics card as the source of data corruption and said Digital Video Interface cable is classified into a class in which the Digital Video Interface cable is graded.

7. The method of claim 6 wherein said classifying comprises:
comparing said stream of pixel data to one or more expected pixel data values; and
maintaining a count for each subset of pixel data not matching said one or more expected pixel data values.

8. The method of claim 7 wherein said classifying comprising comparing said count to a threshold error rate to determine whether said threshold error rate is surpassed.

9. The method of claim 6, wherein said sideband communications path comprises a system bus coupling said graphics card and said video formatter card.

10. The method of claim 6, wherein said classifying comprises at least three different classes of signal quality.

11. A computing system, comprising:
a system bus;
a video formatter card coupled to the system bus for formatting computer-generated video images, the video formatter card including a signal integrity evaluator ("SIE"), the video formatter card having a first port for a digital video loopback cable; and
a graphics card including a graphics processing unit (GPU) coupled to the system bus; the graphics card including a second port for said digital video loopback cable;
the graphics card being configured to send a test mode initiation signal to said signal integrity evaluator in the video formatter card via a sideband communications path in order to initiate testing of said digital video loopback cable with said graphics card generating test pixel data having values configured to test said digitized video cable, said graphics card being configured to send said test pixel data to said signal integrity evaluator via said digital video loopback cable;
wherein said signal integrity evaluator in said video formatter card in response to receiving the test mode initiation signal over the sideband communications path inspects the test pixel data and classifies the amount of pixel data corruption associated with the digital video loopback cable, the computing system eliminating a requirement to disconnect said video loopback cable to apply test signals to perform testing, thereby providing for in-situ testing of said video loopback cable to determine whether said video loopback cable requires replacement and wherein said in-situ testing eliminates the graphics card as the source of data corruption.

* * * * *